March 12, 1957 V. S. FLEMING 2,784,498
PLUMB BOB
Filed March 14, 1956
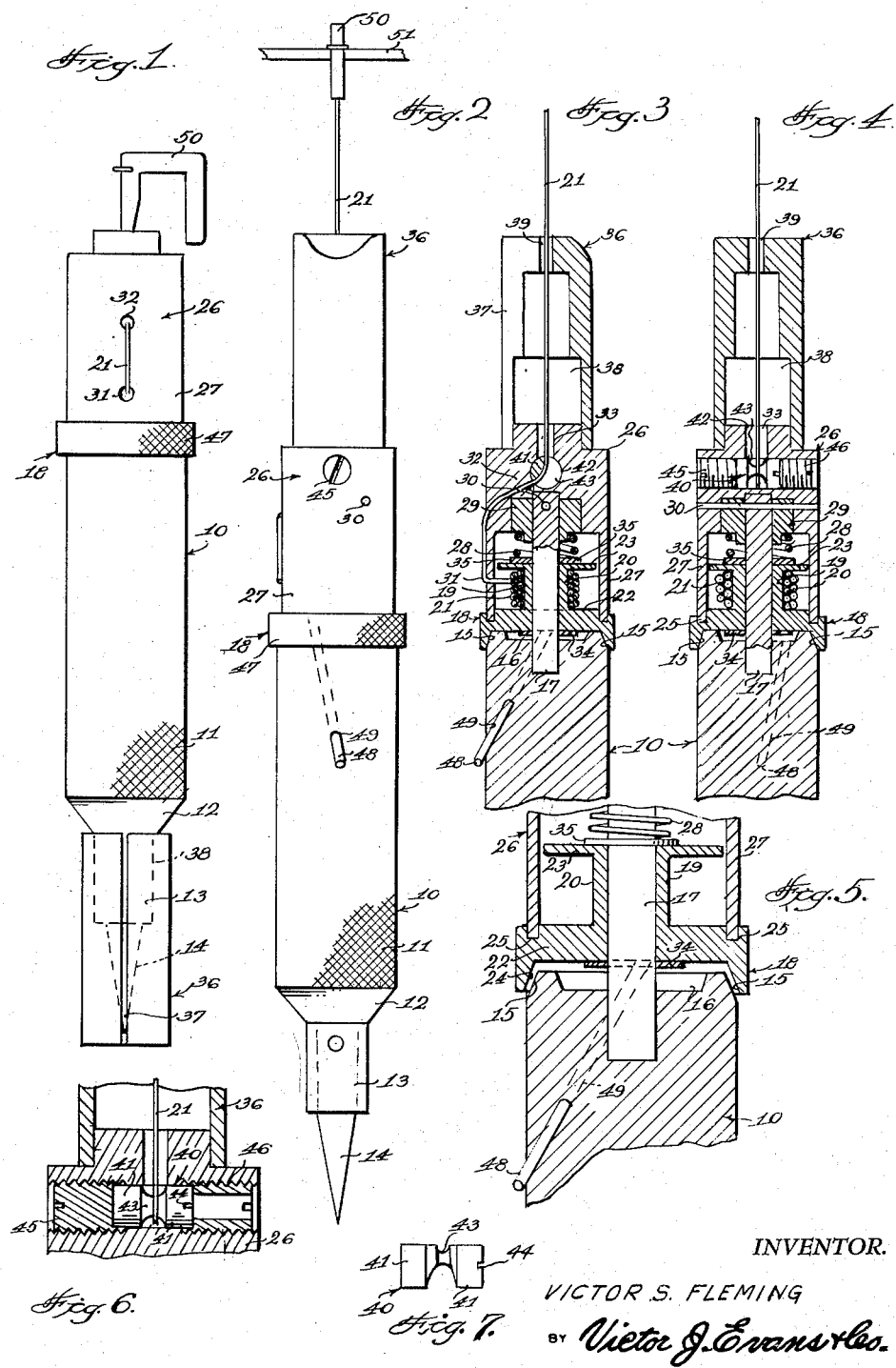
INVENTOR.
VICTOR S. FLEMING
BY Victor J. Evans & Co.
ATTORNEYS

United States Patent Office 2,784,498
Patented Mar. 12, 1957

2,784,498

PLUMB BOB

Victor S. Fleming, Phoenix, Ariz.

Application March 14, 1956, Serial No. 571,388

4 Claims. (Cl. 33—217)

This invention relates to a measuring instrument, and more particularly to a plumb bob.

The object of the invention is to provide a plumb bob which includes a reel for holding the plumb line.

Another object of the invention is to provide a plumb bob which includes a reel for holding the line and whereby the line can be readily removed or replaced on the reel, there being a clutch or brake mechanism for holding the parts immobile in their adjusted position, and wherein the plumb bob can be accurately adjusted as desired.

A further object of the invention is to provide a plumb bob which is extremely simple and inexpensive to manufacture.

Other objects and advantages will be apparent during the course of the following description.

In the accompanying drawings forming a part of this application, and in which like numerals are used to designate like parts throughout the same.

Figure 1 is a side elevational view of the plumb bob, showing the body member on the pointed end so as to protect the lower pointed end.

Figure 2 is a view taken at right angle to the view shown in Figure 1, and showing the lower pointed end uncovered and with the body member on top of the device.

Figure 3 is a fragmentary sectional view illustrating certain constructional details of the apparatus.

Figure 4 is a view similar to Figure 3, but taken at right angles to the view shown in Figure 3.

Figure 5 is a fragmentary sectional view showing the support member in raised position as when the clutch or brake is released so that the plumb line can be unwound or wound on the reel.

Figure 6 is a fragmentary sectional view illustrating the adjustable cam member.

Figure 7 is an elevational view of the cam member.

Referring in detail to the drawings, the numeral 10 designates a cylindrical base which can be made of any suitable material such as metal, and the base 10 may have its outer surface knurled as at 11 so as to facilitate the manual gripping or rotation thereof. Arranged on the lower end of the base 10 is a frusto-conical section 12 which terminates in a cylindrical section 13, and depending from the cylindrical section 13 is a pointed portion 14, Figure 2. The upper end of the base 10 is provided with an annular tapered or beveled portion 15, and there is further provided within the top of the base 10 a recessed section 16, Figure 5, for a purpose to be later described.

Arranged above the base 10 is a support member 18, and extending upwardly from the base 10 and secured to the base 10 is a shaft 17, the support member 18 including a hub 19 which rotatably engages the shaft 17. The outer portion of the hub 19 provides a reel 20 which is adapted to hold a portion of the plumb line 21. The support member 18 further includes a lower disk 22 and an upper flange 23, and the disk and flange are each of circular shape. The lower end of the support 18 is provided with a tapered or beveled surface 24 which is adapted to coact with the beveled surface 15 on the top of the base so that when the surfaces 24 and 15 are in engagement with each other, a brake is provided against further rotation of the reel 20. The disk 22 is further provided with an annular groove 25 in its upper surface, Figure 5.

The plumb bob of the present invention further includes a housing which is indicated generally by the numeral 26, and the housing 26 includes a cylindrical side wall 27 which has its lower end seated in the groove 25 in the top of the disk 22. The coil spring 28 is circumposed on the upper portion of the shaft 17, and the coil spring 28 is interposed between the flange 23 and a bearing member 29 which is mounted on the upper end of the shaft 17. A pin 30 extends through the housing 26, through the bearing member 29, and through the top of the shaft 17.

The side wall 27 of the housing 26 is provided with an aperture 31 through which extends the plumb line 21, and the plumb line 21 also extends up through an inclined passageway 32 in the housing 26 and up through a bore 33 in the top of the housing. A washer 34 is arranged at the bottom of the support member 18, and a similar washer 35 is arranged at the top of the support member 18.

A body member 36 may either be arranged as shown in Figure 3, or else it can be arranged as shown in Figure 1 and when the body member 36 is in the position shown in Figure 1 it will serve to protect the pointed end 14. The body member 36 is provided with a slot 37 so that the plumb line 21 can be readily moved therethrough, and the body member 36 is also provided with an enlarged inner chamber 38 which provides clearance for the cylindrical portion 13 on the bottom of the base. An opening 39 is provided in the top of the body member 36 for the projection therethrough of the plumb line 21.

The housing 26 is provided with a transverse bore 42, Figure 6, and a cam member 40 is rotatably mounted on the bore 42. The cam member 40 includes cylindrical end portions 41 and an intermediate offset cam groove 43 which is engaged by the plumb line 21. The cam member 40 is provided with a kerf or slit 44 in one end thereof whereby a screwdriver or the like can be used for rotating the cam member. Suitable securing elements such as bolts or screws 45 and 46 threadedly engage end portions of the bore 42 for maintaining the cam member 40 immobile in its adjusted positions.

The outer surface of the disk 22 may be knurled or roughened as at 47 so as to facilitate the manual gripping thereof.

A manually operable means is provided for releasing the brake or clutch so that the parts can be moved to the position shown in Figure 5 as when the plumb line 21 is to be removed or replaced on the reel, and this manually operable means comprises a pin 48 which is slidably arranged in a bore or opening 49 in the base 10. The upper end of the pin 48 is adapted to engage the bottom of the disk 22.

The hook 50 is connected to the upper end of the plumb line 21, whereby the hook 50 can be connected to any suitable supporting structure so as to facilitate the use of the device. Thus, as shown in Figure 2, the hook 50 can be arranged in engagement with a suitable wire, cable, or line 51.

From the foregoing, it is apparent that there has been provided a plumb bob and in use by manually pressing the pins 48 inwardly through the bore 49, the disk 22 can be moved from the position shown in Figures 1, 2, 3 and 4 to the position shown in Figure 5 whereby the disk 22 of the lower end of the support member 18 is free to rotate. Thus, with the support member 18 in the position shown in Figure 5 the plumb line 21 can be readily unwound from or wound on the reel.

In use, the hook 50 can be arranged in engagement with any suitable supporting member as for example an over head line 51 as shown in Figure 2. When the line 21 is to be removed or replaced on the support member 18, the pin 48 is manually depressed into the bore 49 whereby the support member 18 will be raised from the position shown in Figures 3 and 4 to the position shown in Figure 5 so that the surface 24 will be out of contact with the surface 15 whereby the support member 18 will be free to rotate. When the support member 18 is in the position shown in Figure 5 the coil spring 28 is under compression and the support member 18 is free to rotate on the shaft 17. The support member 18 can be rotated by manually engaging the knurled surface 47 of the support member 18. The plumb line 21 passes out through the aperture 31 in the side wall 27, and the plumb line 21 passes up through the inclined opening 32 and then through the opening 33. Normally when the device is not being used the parts are in the position shown in Figure 1 so that the body member 36 is releasably mounted over the pointed end 14 so that the pointed end 14 will not be accidentally damaged. However, when the plumb bob is to be used, the body member 36 is readily removed from the position shown in Figure 1 and arranged in the position shown in Figures 2, 3 and 4 so that the plumb line passes up through the opening 39 in the end of the body member 36 whereby the plumb line is maintained in alignment with respect to the rest of the parts. The member 29 acts as a bearing within the housing 26. When pressure is released on the pin 48, the coil spring 28 will return the parts from the position shown in Figure 5 to the position shown in Figures 1 through 4 so that a brake is provided between the surfaces 24 and 15 whereby further rotation of the support member 18 is prevented until the pin 48 is again gradually depressed. The plumb line 21 engages the offset groove 43 in the cam member 40, Figures 6 and 7. To adjust the cam member 40 as when the plumb line 21 is to be adjusted in order to properly align or center the plumb line, either or both of the bolts or screws 45 and 46 can be removed whereby a screwdriver or the like can be arranged in engagement with the kerf 44 in the end of the cam member 40 so that the cam member 40 can be rotated whereby the position of the plumb line 21 can be adjusted as desired, and afterwards the parts can be replaced to the position shown in Figure 6.

The parts can be made of any suitable material and in any desired size.

When the device is being used, the button or pin 48 can be pushed in and then the desired amount of line 21 can be pulled out. The shield 36 is left on the point 14 until the point is required for measurement. In the event that the line 21 breaks, the device can be partially disassembled so as to gain access to the plumb line. The hook 50 of the line facilitates engagement of the line with the member such as the member 51. Thus, with the hook 50, the device can be readily thrown over an overhead wire so as to engage such an overhead wire such as the wire 51. After the job has been completed, the hook is disengaged by snapping the line. This is especially useful on jobs where a long overhead wire is used to line up machinery, walls and the like. The line 21 is of a strong type and is light in weight. The spool or support member 18 rotates on the shaft 17 and the spring 28 prevents accidental unwinding of the line. The shield 36 protects the point from accidental damage and the shield is left on until the final adjustment is made at which time the shield may be removed and placed on top of the bob as shown in Figures 2, 3 and 4. The adjustment of the cam member 40 shown in the drawings insures that the device can be properly aligned whereby the longitudinal axis of the line and the point will coincide and this permits adjustment or compensation for wear and unequal size line for weight distribution.

I claim:

1. In a plumb bob, a cylindrical base having a lower pointed end, the outer upper surface of said base being beveled inwardly, a shaft extending upwardly from said base and secured thereto, a support member provided with a longitudinally extending bore for rotatably engaging said shaft, said support member including a hub providing a spool, an annular flange on the upper end of said support member, a disk on the lower end of said support member provided with a lower tapered annular surface mounted for movement into and out of engagement with the beveled surface on said base, a line trained over said spool, there being an annular groove in the upper surface of said disk, a housing including an annular side wall having its lower edge seated in said groove, a bearing member seated in said chamber and mounted on the upper end of said shaft, there being an aperture in the side wall of said housing for the passage therethrough of a portion of the line, there being an inclined passageway in said housing for the passage therethrough of the line, there being a transverse opening in said housing, a cam member mounted in said last named opening and including an offset groove engaging said line, securing elements engaging said cam member, and resilient means arranged in engagement with said support member.

2. In a plumb bob, a cylindrical base having a lower pointed end, the outer upper surface of said base being beveled inwardly, a shaft extending upwardly from said base and secured thereto, a support member provided with a longitudinally extending bore for rotatably engaging said shaft, said support member including a hub providing a spool, an annular flange on the upper end of said support member, a disk on the lower end of said support member provided with a lower tapered annular surface mounted for movement into and out of engagement with the beveled surface on said base, a line trained over said spool, there being an annular groove in the upper surface of said disk, a housing including an annular side wall having its lower edge seated in said groove, a bearing member seated in said chamber and mounted on the upper end of said shaft, there being an aperture in the side wall of said housing for the passage therethrough of a portion of the line, there being an inclined passageway in said housing for the passage therethrough of the line, there being a transverse opening in said housing, a cam member mounted in said last named opening and including an offset groove engaging said line, securing elements engaging said cam member, and resilient means arranged in engagement with said support member, said resilient means comprising a coil spring circumposed on said shaft, and a hook on the upper end of said line.

3. In a plumb bob, a cylindrical base having a lower pointed end, the outer upper surface of said base being beveled inwardly, a shaft extending upwardly from said base and secured thereto, a support member provided with a longitudinally extending bore for rotatably engaging said shaft, said support member including a hub providing a spool, an annular flange on the upper end of said support member, a disk on the lower end of said support member provided with a lower tapered annular surface mounted for movement into and out of engagement with the beveled surface on said base, a line trained over said spool, there being an annular groove in the upper surface of said disk, a housing including an annular side wall having its lower edge seated in said groove, a bearing member seated in said chamber and mounted on the upper end of said shaft, there being an aperture in the side wall of said housing for the passage therethrough of a portion of the line, there being an inclined passageway in said housing for the passage therethrough of the line, there being a transverse opening in said housing, a cam member mounted in said last named opening and including an offset groove engaging said line, securing elements engaging said cam member, and resilient means arranged in engagement with said support member, said resilient means comprising a coil spring circumposed on said shaft, and a hook on the upper end of said line, and a body member for protecting the pointed end of said base when the plumb bob is not being used.

4. In a plumb bob, a base having a lower pointed end, the outer upper surface of said base being beveled inwardly, a shaft extending upwardly from said base and secured thereto, a support member provided with a bore for rotatably engaging said shaft, said support member including a hub providing a spool, a flange on the upper end of said support member, a disk on the lower end of said support member provided with a lower tapered annular surface mounted for movement into and out of engagement with the beveled surface on said base, a line trained over said spool, there being a groove in the upper surface of said disk, a housing including a side wall having its lower edge seated in said groove, a bearing member seated in said chamber and mounted on said shaft, there being an aperture in the side wall of said housing for the passage therethrough of a portion of the line, there being a passageway in said housing for the passage therethrough of the line, there being an opening in said housing, a cam member mounted in said last named opening and including a groove engaging said line, securing elements engaging said cam member, and resilient means arranged in engagement with said support member.

References Cited in the file of this patent

UNITED STATES PATENTS

| | | |
|---|---|---|
| 909,846 | Cavileer | Jan. 12, 1909 |
| 1,336,289 | Fagrie | Apr. 6, 1920 |
| 1,708,778 | Powell | Apr. 9, 1929 |
| 1,814,484 | Morris | July 14, 1931 |
| 2,673,398 | Baumgart | Mar. 30, 1954 |